United States Patent
Dalmas, II et al.

(10) Patent No.: US 10,598,285 B2
(45) Date of Patent: Mar. 24, 2020

(54) PISTON SEALING SYSTEM

(71) Applicant: Quest Engines, LLC, Coopersburg, PA (US)

(72) Inventors: Elario Dino Dalmas, II, Macungie, PA (US); Roy A. Blom, Coopersburg, PA (US)

(73) Assignee: QUEST ENGINES, LLC

( * ) Notice: Subject to any disclaimer, the term of this patent is extended or adjusted under 35 U.S.C. 154(b) by 96 days.

(21) Appl. No.: 15/941,397

(22) Filed: Mar. 30, 2018

(65) Prior Publication Data

US 2018/0283555 A1    Oct. 4, 2018

Related U.S. Application Data

(63) Continuation-in-part of application No. 15/938,427, filed on Mar. 28, 2018, and a continuation-in-part of application No. 15/938,130, filed on Mar. 28, 2018, and a continuation-in-part of application No. 15/937,293, filed on Mar. 27, 2018, and a continuation-in-part of application No. 15/936,713, filed on Mar. 27, 2018, and a continuation-in-part of
(Continued)

(51) Int. Cl.
| | |
|---|---|
| F16J 15/16 | (2006.01) |
| F02F 3/24 | (2006.01) |
| F16J 1/02 | (2006.01) |
| F02F 3/28 | (2006.01) |
| F01C 19/00 | (2006.01) |

(52) U.S. Cl.
CPC ............ *F16J 15/164* (2013.01); *F02F 3/24* (2013.01); *F16J 1/02* (2013.01); *F01C 19/00* (2013.01); *F02F 3/28* (2013.01)

(58) Field of Classification Search
CPC ..... F16J 15/164; F16J 1/02; F02F 3/24; F02F 3/28; F01C 19/00
See application file for complete search history.

(56) References Cited

U.S. PATENT DOCUMENTS

| | | | |
|---|---|---|---|
| 1,016,561 A | 2/1912 | Grabler | |
| 1,046,359 A | 12/1912 | Winton | |
| (Continued) | | | |

FOREIGN PATENT DOCUMENTS

| | | |
|---|---|---|
| CN | 201526371 | 7/2010 |
| CN | 106321916 | 1/2017 |
| (Continued) | | |

OTHER PUBLICATIONS

Graunke, K. et al., "Dynamic Behavior of Labyrinth Seals in Oilfree Labyrinth-Piston Compressors" (1984). International Compressor Engineering Conference. Paper 425. http://docs.lib.purdue.edu/icec/425.
(Continued)

*Primary Examiner* — Jacob M Amick
*Assistant Examiner* — Charles Brauch
(74) *Attorney, Agent, or Firm* — Yohannan Law; David R Yohannan

(57) ABSTRACT

A piston and cylinder arrangement is disclosed in which a field of spaced pockets is provided on the walls of a piston skirt and/or the cylinder to create a seal equivalent between the piston and the cylinder. The pockets may be provided in a pattern having a plurality of vertically spaced rows.

28 Claims, 7 Drawing Sheets

Related U.S. Application Data application No. 15/934,742, filed on Mar. 23, 2018, and a continuation-in-part of application No. 15/934,625, filed on Mar. 23, 2018, and a continuation-in-part of application No. 15/903,636, filed on Feb. 23, 2018.

(60) Provisional application No. 62/501,295, filed on May 4, 2017, provisional application No. 62/491,629, filed on Apr. 28, 2017, provisional application No. 62/479,013, filed on Mar. 30, 2017.

(56) References Cited

U.S. PATENT DOCUMENTS

| | | | |
|---|---|---|---|
| 1,329,559 | A | 2/1920 | Tesla |
| 1,418,838 | A | 6/1922 | Setz |
| 1,511,338 | A | 10/1924 | Cyril |
| 1,527,166 | A | 2/1925 | Maurice |
| 1,639,308 | A | 8/1927 | Orr |
| 1,869,178 | A | 7/1932 | Thuras |
| 1,967,682 | A | 7/1934 | Ochtman, Jr. |
| 1,969,704 | A | 8/1934 | D'Alton |
| 2,025,297 | A | 12/1935 | Meyers |
| 2,224,475 | A | 12/1940 | Evans |
| 2,252,914 | A | 8/1941 | Balton |
| 2,283,567 | A | 5/1942 | Barton |
| 2,442,917 | A | 6/1948 | Butterfield |
| 2,451,271 | A | 10/1948 | Balster |
| 2,468,976 | A | 5/1949 | Herreshoff |
| 2,471,509 | A | 5/1949 | Anderson |
| 2,878,990 | A | 3/1950 | Zurcher |
| 2,644,433 | A | 7/1953 | Anderson |
| 2,761,516 | A | 9/1956 | Vassilkovsky |
| 2,766,839 | A | 10/1956 | Baruch |
| 2,898,894 | A | 8/1959 | Holt |
| 2,915,050 | A | 12/1959 | Allred |
| 2,956,738 | A | 10/1960 | Rosenschold |
| 2,977,943 | A | 4/1961 | Lieberherr |
| 2,979,046 | A | 4/1961 | Hermann |
| 3,033,184 | A | 5/1962 | Jackson |
| 3,035,879 | A | 5/1962 | Jost |
| 3,113,561 | A | 12/1963 | Heintz |
| 3,143,282 | A | 8/1964 | McCrory |
| 3,154,059 | A | 10/1964 | Witzky |
| 3,171,425 | A | 3/1965 | Berlyn |
| 3,275,057 | A | 9/1966 | Trevor |
| 3,399,008 | A | 8/1968 | Farrell |
| 3,409,410 | A | 11/1968 | Spence |
| 3,491,654 | A | 1/1970 | Zurcher |
| 3,534,771 | A | 10/1970 | Everdam |
| 3,621,821 | A | 11/1971 | Jarnuszkiewicz |
| 3,749,318 | A | 7/1973 | Cottell |
| 3,881,459 | A | 5/1975 | Gaetcke |
| 3,892,070 | A | 7/1975 | Bose |
| 3,911,753 | A | 10/1975 | Daub |
| 3,973,532 | A | 8/1976 | Litz |
| 4,043,224 | A | 8/1977 | Quick |
| 4,046,028 | A | 9/1977 | Vachris |
| 4,077,429 | A | 3/1978 | Kimball |
| 4,127,332 | A | 11/1978 | Thiruvengadam |
| 4,128,388 | A | 12/1978 | Freze |
| 4,164,988 | A | 8/1979 | Virva |
| 4,182,282 | A | 1/1980 | Pollet |
| 4,185,597 | A | 1/1980 | Cinquegrani |
| 4,271,803 | A | 6/1981 | Nakanishi |
| 4,300,499 | A | 11/1981 | Nakanishi |
| 4,312,305 | A | 1/1982 | Noguchi |
| 4,324,214 | A | 4/1982 | Garcea |
| 4,331,118 | A | 5/1982 | Cullinan |
| 4,332,229 | A | 6/1982 | Schuit |
| 4,343,605 | A | 8/1982 | Browning |
| 4,357,916 | A | 11/1982 | Noguchi |
| 4,383,508 | A | 5/1983 | Irimajiri |
| 4,467,752 | A | 8/1984 | Yunick |
| 4,480,597 | A | 11/1984 | Noguchi |
| 4,488,866 | A | 12/1984 | Schirmer |
| 4,541,377 | A | 9/1985 | Amos |
| 4,554,893 | A | 11/1985 | Vecellio |
| 4,570,589 | A | 2/1986 | Fletcher |
| 4,576,126 | A | 3/1986 | Ancheta |
| 4,592,318 | A | 6/1986 | Pouring |
| 4,597,342 | A | 7/1986 | Green |
| 4,598,687 | A | 7/1986 | Hayashi |
| 4,669,431 | A | 6/1987 | Simay |
| 4,715,791 | A | 12/1987 | Berlin |
| 4,724,800 | A | 2/1988 | Wood |
| 4,756,674 | A | 7/1988 | Miller |
| 4,788,942 | A | 12/1988 | Pouring |
| 4,836,154 | A | 6/1989 | Bergeron |
| 4,874,310 | A | 10/1989 | Seemann |
| 4,879,974 | A | 11/1989 | Alvers |
| 4,919,611 | A | 4/1990 | Flament |
| 4,920,937 | A | 5/1990 | Sasaki |
| 4,936,269 | A | 6/1990 | Beaty |
| 4,969,425 | A | 11/1990 | Slee |
| 4,990,074 | A | 2/1991 | Nakagawa |
| 4,995,349 | A | 2/1991 | Tuckey |
| 5,004,066 | A | 4/1991 | Furukawa |
| 5,007,392 | A | 4/1991 | Niizato |
| 5,020,504 | A | 6/1991 | Morikawa |
| 5,083,539 | A | 1/1992 | Cornelio |
| 5,154,141 | A | 10/1992 | McWhorter |
| 5,168,843 | A | 12/1992 | Franks |
| 5,213,074 | A | 5/1993 | Imagawa |
| 5,222,879 | A | 6/1993 | Kapadia |
| 5,251,817 | A | 10/1993 | Ursic |
| 5,343,618 | A | 9/1994 | Arnold |
| 5,357,919 | A | 10/1994 | Ma |
| 5,390,634 | A | 2/1995 | Walters |
| 5,397,180 | A | 3/1995 | Miller |
| 5,398,645 | A | 3/1995 | Haman |
| 5,454,712 | A | 10/1995 | Yap |
| 5,464,331 | A | 11/1995 | Sawyer |
| 5,479,894 | A | 1/1996 | Noltemeyer |
| 5,593,399 | A * | 1/1997 | Tanzer .............. A61F 13/5323 604/358 |
| 5,694,891 | A | 12/1997 | Liebich |
| 5,714,721 | A | 2/1998 | Gawronski |
| 5,779,461 | A | 7/1998 | Iizuka |
| 5,791,303 | A | 8/1998 | Skripov |
| 5,872,339 | A | 2/1999 | Hanson |
| 5,937,821 | A | 8/1999 | Oda |
| 5,957,096 | A | 9/1999 | Clarke |
| 6,003,488 | A | 12/1999 | Roth |
| 6,019,188 | A | 2/2000 | Nevill |
| 6,119,648 | A | 9/2000 | Araki |
| 6,138,616 | A | 10/2000 | Svensson |
| 6,138,639 | A | 10/2000 | Hiraya |
| 6,199,369 | B1 | 3/2001 | Meyer |
| 6,205,962 | B1 | 3/2001 | Berry, Jr. |
| 6,237,164 | B1 | 5/2001 | LaFontaine |
| 6,257,180 | B1 | 7/2001 | Klein |
| 6,363,903 | B1 | 4/2002 | Hayashi |
| 6,382,145 | B2 | 5/2002 | Matsuda |
| 6,418,905 | B1 | 7/2002 | Baudlot |
| 6,446,592 | B1 | 9/2002 | Wilksch |
| 6,474,288 | B1 | 11/2002 | Blom |
| 6,494,178 | B1 | 12/2002 | Cleary |
| 6,508,210 | B2 | 1/2003 | Knowlton |
| 6,508,226 | B2 | 1/2003 | Tanaka |
| 6,536,420 | B1 | 3/2003 | Cheng |
| 6,639,134 | B2 | 10/2003 | Schmidt |
| 6,668,703 | B2 | 12/2003 | Gamble |
| 6,682,313 | B1 | 1/2004 | Sulmone |
| 6,691,932 | B1 | 2/2004 | Schultz |
| 6,699,031 | B2 | 3/2004 | Kobayashi |
| 6,705,281 | B2 | 3/2004 | Okamura |
| 6,718,938 | B2 | 4/2004 | Szorenyi |
| 6,758,170 | B1 | 7/2004 | Walden |
| 6,769,390 | B2 | 8/2004 | Hattori |
| 6,814,046 | B1 | 11/2004 | Hiraya |
| 6,832,589 | B2 | 12/2004 | Kremer |
| 6,834,626 | B1 | 12/2004 | Holmes |

(56) References Cited

U.S. PATENT DOCUMENTS

| | | |
|---|---|---|
| 6,971,379 B2 | 12/2005 | Sakai |
| 6,973,908 B2 | 12/2005 | Paro |
| 7,074,992 B2 | 7/2006 | Schmidt |
| 7,150,609 B2 | 12/2006 | Kiem |
| 7,261,079 B2 | 8/2007 | Gunji |
| 7,296,545 B2 | 11/2007 | Ellingsen, Jr. |
| 7,341,040 B1 | 3/2008 | Wiesen |
| 7,360,531 B2 | 4/2008 | Yohso |
| 7,452,191 B2 | 11/2008 | Tell |
| 7,559,298 B2 | 7/2009 | Cleeves |
| 7,576,353 B2 | 8/2009 | Diduck |
| 7,584,820 B2 | 9/2009 | Parker |
| 7,628,606 B1 | 12/2009 | Browning |
| 7,634,980 B2 | 12/2009 | Jarnland |
| 7,717,701 B2 | 5/2010 | D'Agostini |
| 7,810,479 B2 | 10/2010 | Naquin |
| 7,900,454 B2 | 3/2011 | Schoell |
| 7,984,684 B2 | 7/2011 | Hinderks |
| 8,037,862 B1 | 10/2011 | Jacobs |
| 8,215,292 B2 | 7/2012 | Bryant |
| 8,251,040 B2 | 8/2012 | Jang |
| 8,284,977 B2 | 10/2012 | Ong |
| 8,347,843 B1 | 1/2013 | Batiz-Vergara |
| 8,385,568 B2 | 2/2013 | Goel |
| 8,479,871 B2 | 7/2013 | Stewart |
| 8,640,669 B2 | 2/2014 | Nakazawa |
| 8,656,870 B2 | 2/2014 | Sumilla |
| 8,714,135 B2 | 5/2014 | Anderson |
| 8,776,759 B2 | 7/2014 | Cruz |
| 8,800,527 B2 | 8/2014 | McAlister |
| 8,827,176 B2 | 9/2014 | Browning |
| 8,857,405 B2 | 10/2014 | Attard |
| 8,863,724 B2 | 10/2014 | Shkolnik |
| 8,919,321 B2 | 12/2014 | Burgess |
| 9,175,736 B2 | 11/2015 | Greuel |
| 9,289,874 B1 | 3/2016 | Sabo |
| 9,309,807 B2 | 4/2016 | Burton |
| 9,441,573 B1 | 9/2016 | Sergin |
| 9,512,779 B2 | 12/2016 | Redon |
| 9,736,585 B2 | 8/2017 | Pattok |
| 9,739,382 B2 | 8/2017 | Laird |
| 9,822,968 B2 | 11/2017 | Tamura |
| 9,854,353 B2 | 12/2017 | Wang |
| 9,938,927 B2 | 4/2018 | Ando |
| 2002/0114484 A1 | 8/2002 | Crisco |
| 2002/0140101 A1 | 10/2002 | Yang |
| 2003/0111122 A1 | 6/2003 | Horton |
| 2005/0036896 A1 | 2/2005 | Navarro |
| 2005/0087166 A1 | 4/2005 | Rein |
| 2005/0155645 A1 | 7/2005 | Freudendahl |
| 2005/0257837 A1 | 11/2005 | Bailey |
| 2006/0230764 A1 | 10/2006 | Schmotolocha |
| 2007/0039584 A1 | 2/2007 | Ellingsen, Jr. |
| 2007/0101967 A1 | 5/2007 | Pegg |
| 2008/0169150 A1 | 7/2008 | Kuo |
| 2008/0184878 A1 | 8/2008 | Chen |
| 2008/0185062 A1 | 8/2008 | Johannes Nijland |
| 2010/0071640 A1 | 3/2010 | Mustafa |
| 2011/0030646 A1 | 2/2011 | Barry |
| 2011/0132309 A1 | 6/2011 | Turner |
| 2011/0139114 A1* | 6/2011 | Nakazawa ............ F02F 3/027 123/193.6 |
| 2011/0235845 A1 | 9/2011 | Wang |
| 2012/0103302 A1 | 5/2012 | Attard |
| 2012/0114148 A1 | 5/2012 | Goh Kong San |
| 2012/0186561 A1 | 7/2012 | Bethel |
| 2013/0036999 A1 | 2/2013 | Levy |
| 2013/0327039 A1 | 12/2013 | Schenker et al. |
| 2014/0056747 A1 | 2/2014 | Kim |
| 2014/0109864 A1 | 4/2014 | Drachko |
| 2014/0199837 A1 | 7/2014 | Hung |
| 2014/0361375 A1 | 12/2014 | Deniz |
| 2015/0059718 A1 | 3/2015 | Claywell |
| 2015/0153040 A1 | 6/2015 | Rivera Garza |
| 2015/0167536 A1 | 6/2015 | Toda et al. |
| 2015/0184612 A1 | 7/2015 | Takada et al. |
| 2015/0337878 A1 | 11/2015 | Schlosser |
| 2015/0354570 A1 | 12/2015 | Karoliussen |
| 2016/0017839 A1 | 1/2016 | Johnson |
| 2016/0064518 A1 | 3/2016 | Liu |
| 2016/0258347 A1 | 9/2016 | Riley |
| 2016/0265416 A1 | 9/2016 | Ge |
| 2016/0348611 A1 | 12/2016 | Suda et al. |
| 2016/0348659 A1 | 12/2016 | Pinkerton |
| 2016/0356216 A1 | 12/2016 | Klyza |
| 2017/0248099 A1 | 8/2017 | Wagner |
| 2017/0260725 A1 | 9/2017 | McAlpine |
| 2018/0096934 A1 | 4/2018 | Siew |
| 2018/0130704 A1 | 5/2018 | Li |

FOREIGN PATENT DOCUMENTS

| | | | |
|---|---|---|---|
| CN | 206131961 | 4/2017 | |
| DE | 19724225 | 12/1998 | |
| EP | 0025831 | 4/1981 | |
| EP | 2574796 | 4/2013 | |
| FR | 1408306 | 8/1965 | |
| FR | 2714473 | 6/1995 | |
| GB | 104331 | 1/1918 | |
| GB | 139271 | 3/1920 | |
| GB | 175179 | 11/1937 | |
| GB | 854135 | 11/1960 | |
| GB | 1437340 | 5/1976 | |
| GB | 1504279 | 3/1978 | |
| GB | 1511538 | 5/1978 | |
| GB | 2140870 | 12/1984 | |
| JP | S5377346 | 7/1978 | |
| JP | S5833393 | 2/1983 | |
| JP | 58170840 | 10/1983 | |
| JP | S5973618 | 4/1984 | |
| JP | H02211357 | 8/1990 | |
| JP | H0638288 | 5/1994 | |
| JP | 2000064905 | 3/2000 | |
| JP | 2003065013 | 3/2003 | |
| JP | 5535695 | 7/2014 | |
| TW | 201221753 | 6/2012 | |
| WO | 1983001485 | 4/1983 | |
| WO | 2006046027 | 5/2006 | |
| WO | 2007065976 | 6/2007 | |
| WO | WO-2007076802 A1 * | 7/2007 | ............. F02B 23/06 |
| WO | 2010118518 | 10/2010 | |
| WO | 2016145247 | 9/2016 | |

OTHER PUBLICATIONS

International Searching Authority Search Report and Written Opinion for application PCT/US2018/024102, dated Jun. 25, 2018, 10 pages.

International Searching Authority Search Report and Written Opinion for application PCT/US2018/024477, dated Jul. 20, 2018, 14 pages.

International Searching Authority Search Report and Written Opinion for application PCT/US2018/024485, dated Jun. 25, 2018, 16 pages.

International Searching Authority Search Report and Written Opinion for application PCT/US2018/024844, dated Jun. 8, 2018, 9 pages.

International Searching Authority Search Report and Written Opinion for application PCT/US2018/024852, dated Jun. 21, 2018, 9 pages.

International Searching Authority Search Report and Written Opinion for application PCT/US2018/025133, dated Jun. 28, 2018, 9 pages.

International Searching Authority Search Report and Written Opinion for application PCT/US2018/025151, dated Jun. 25, 2018, 14 pages.

International Searching Authority Search Report and Written Opinion for application PCT/US2018/025471, dated Jun. 21, 2018, 10 pages.

International Searching Authority Search Report and Written Opinion for application PCT/US2018/029947, dated Jul. 26, 2018, 12 pages.

(56) References Cited

OTHER PUBLICATIONS

International Searching Authority Search Report and Written Opinion for application PCT/US2018/030937, dated Jul. 9, 2018, 7 pages.
International Searching Authority Search Report and Written Opinion for application PCT/US2018/053264, dated Dec. 3, 2018, 10 pages.
International Searching Authority Search Report and Written Opinion for application PCT/US2018/053350, dated Dec. 4, 2018, 7 pages.
International Searching Authority Search Report and Written Opinion for application PCT/US2019/014936, dated Apr. 18, 2019, 9 pages.
International Searching Authority Search Report and Written Opinion for application PCT/US2019/015189, dated Mar. 25, 2019, 10 pages.
Keller, L. E., "Application of Trunk Piston Labyrinth Compressors in Refrigeration and Heat Pump Cycles" (1992). International Compressor Engineering Conference. Paper 859. http://docs.lib.purdue.edu/icec/859.
Quasiturbine Agence, "Theory—Quasiturbine Concept" [online], Mar. 5, 2005 (Mar. 5, 2005), retrieved from the internet on Jun. 29, 2018) URL:http://quasiturbine.promci.qc.ca/ETheoryQTConcept.htm; entire document.
Vetter, H., "The Sulzer Oil-Free Labyrinth Piston Compressor" (1972). International Compressor Engineering Conference. Paper 33. http://docs.lib.purdue.edu/icec/33.

\* cited by examiner

PISTON SEALING SYSTEM

CROSS REFERENCE TO RELATED APPLICATIONS

This application relates to and claims the priority of U.S. provisional patent application Ser. No. 62/501,295, which was filed May 4, 2017; U.S. provisional patent application Ser. No. 62/479,013, which was filed Mar. 30, 2017; U.S. provisional patent application Ser. No. 62/491,629, which was filed Apr. 28, 2017; U.S. patent application Ser. No. 15/903,636, which was filed Feb. 23, 2018; U.S. patent application Ser. No. 15/934,625, which was filed Mar. 23, 2018; U.S. patent application Ser. No. 15/934,742, which was filed Mar. 23, 2018; U.S. patent application Ser. No. 15/936,713, which was filed Mar. 27, 2018; U.S. patent application Ser. No. 15/937,293, which was filed Mar. 27, 2018; U.S. patent application Ser. No. 15/938,130, which was filed Mar. 28, 2018; and U.S. patent application Ser. No. 15/938,427, which was filed Mar. 28, 2018.

FIELD OF THE INVENTION

The present invention relates generally to systems and methods for creating a seal between a blocking element, such as a reciprocating piston, and a surface adjacent to the blocking element, such as the wall of a piston cylinder.

BACKGROUND OF THE INVENTION

Reciprocating piston and cylinder arrangements in internal combustion engines, pumps, and the like, typically require a seal between the piston and the cylinder so that a pressure difference can exist between the two ends of the piston. This pressure difference permits the piston to provide a fluid pumping action useful in many things, including pumps and internal combustion engines. Sufficiently sealed piston and cylinder arrangements can be used in two, four, or multi-cycle internal combustion engines, free-piston engines, caloric engines, turbochargers, superchargers, compressors, pumps, and vacuums, for example.

It is to be appreciated that the reference herein to a "cylinder" is not limited to a chamber having a cylindrical shape or circular cross-section. Instead, the term cylinder refers to any chamber or cavity that receives a piston having an outer shape adapted to allow the piston to seal against the sidewall of the cylinder but at the same time permit the piston to slide back and forth reciprocally within the cylinder in a pumping motion.

Engine cylinders may include one or more intake ports and one or more exhaust ports that, collectively, permit gases to flow into, and out of, the engine cylinder, respectively. Engine valves, such as poppet valves, may be used to selectively open and close the intake and exhaust ports. The selectively timed opening and closing of the intake and exhaust valves, in conjunction with the pumping motion of the engine pistons and the introduction of fuel, may provide an air/fuel charge to the engine cylinder for combustion and removal of the spent charge exhaust gases from the cylinder after combustion.

Existing internal combustion engine pistons used for Otto cycle or Diesel cycle operation, for example, typically have a generally cylindrical shape. More specifically, the typical Otto or Diesel cycle engine piston may have a generally smooth cylindrically shaped skirt with a circular cross-section that includes circumferential recesses to receive one or more sealing piston rings. The piston and piston ring assembly may slide reciprocally within a cylinder between top dead center and bottom dead center positions. The interface of the piston rings with the cylinder wall may be lubricated with engine oil, for example.

Internal combustion engines almost universally require liquid lubricant, such as engine oil, to lubricate the interface between the piston and the cylinder within which it moves back and forth in a reciprocal motion. Lubrication systems are usually mission critical and the failure of a lubrication system can be catastrophic. The need for a piston lubricant brings with it many disadvantages. The lubricant wears out and becomes contaminated over time, and thus requires replacement, adding expense and inconvenience to engine operation. Many lubricants require pumps and passages to reapply the lubricant to moving parts, such as the engine pistons. Pumps and passages, and other elements of an active lubrication system need to operate correctly and require seals between interconnected elements. Lubrication system leaks naturally occur as seals deteriorate over time, and pumps leak and wear out, adding still further maintenance expense and inconvenience to engine operation. Leaks can also permit lubricant to enter the combustion chamber, interfering with combustion, and fouling injectors and spark or glow plugs. Lubricant in the combustion chamber can also result in unwanted exhaust emissions. Leaks can also result in the contamination of the lubricant with combustion by-products. All of the foregoing issues are attendant to the use of lubricated pistons, and all add failure modes and maintenance costs. Accordingly, there is a need for internal combustion engines that depend less, or not at all, on piston lubrication.

While embodiments of the invention are not limited to use in internal combustion engines, such engines may benefit from the invention since they routinely use piston and cylinder arrangements in which the piston is sealed with respect to the cylinder using one or more vertically spaced sealing piston rings disposed about the outer surface of the piston skirt. Many other devices besides internal combustion engines and pumps may include moving elements which require that a seal be formed between them. Embodiments of the invention may be used for these applications as well.

OBJECTS OF THE INVENTION

Accordingly, it is an object of some, but not necessarily all embodiments of the present invention to provide contact-less or semi contact-less sealing systems and methods between a blocking element and an adjacent surface.

Accordingly, it is an object of some, but not necessarily all embodiments of the present invention to provide contact-less or semi contact-less sealing systems and methods between a piston (with or without piston rings) and a surrounding cylinder.

It is also an object of some, but not necessarily all embodiments of the present invention to provide sealing systems and methods which reduce frictional losses resulting from contact between the piston rings and the surrounding cylinder by reducing or eliminating the use of piston rings.

It is also an object of some, but not necessarily all embodiments of the present invention to provide sealing systems and methods which does not require the use of a lubricant or requires less changing of a lubricant.

It is also an object of some, but not necessarily all, embodiments of the present invention to provide sealing systems which wear less and sealing methods which induce less wear upon components within the system thereby reducing maintenance requirements and increasing the reliability of the system.

It is also an object of some, but not necessarily all, embodiments of the present invention to reduce the number of parts required for sealing so as to reduce cost and replacement part inventory requirements of the system.

It is also an object of some, but not necessarily all, embodiments of the present invention to provide improved heat transfer between the piston and cylinder surfaces thereby reducing the complexity of the cooling system and increasing system efficiency.

It is also an object of some, but not necessarily all, embodiments of the present invention to provide restorative self-correcting centering action of moving members such as a reciprocating piston within a cylinder.

These and other advantages of some, but not necessarily all, embodiments of the present invention will be apparent to those of ordinary skill in the internal combustion engine arts.

SUMMARY OF THE INVENTION

Responsive to the foregoing challenges, Applicant has developed an innovative sealing system comprising: a first structure surface; a blocking element having a first end, a second end, and a blocking element surface extending between the first end and the second end; a plurality of laterally spaced pockets arranged in a plurality of rows to form a field of pockets on but not extending through the first structure surface, or on but not extending through the blocking element surface, or on but not extending through both the first structure surface and the blocking element surface; and a working fluid provided at the blocking element first end at an elevated pressure relative to a working fluid pressure at the blocking element second end, wherein the first structure surface is disposed in close proximity to, and spaced a substantially uniform distance from, the blocking element surface; and wherein a seal equivalent is produced from working fluid interaction with the field of pockets.

Applicant has further developed an innovative sealing system comprising: a first structure surface; a blocking element having a first end, a second end, and a blocking element surface extending between the first end and the second end; and a plurality of spaced pockets arranged as a field of pockets on but not extending through the first structure surface, or on but not extending through the blocking element surface, or on but not extending through both the first structure surface and the blocking element surface, wherein the first structure surface is disposed in close proximity to, and spaced a substantially uniform distance from, the blocking element surface.

Applicant has still further developed an innovative internal combustion engine comprising: an engine cylinder having a cylinder wall; a piston disposed in the engine cylinder, said piston having a skirt and a head; and a plurality of spaced pockets arranged as a field of pockets on but not extending through the piston skirt, or on but not extending through the engine cylinder, or on but not extending through both the piston skirt and the engine cylinder.

Applicant has still further developed an innovative method of sealing a first structure surface relative to a blocking element surface between a blocking element first end and a blocking element second end, wherein the first structure surface is disposed in close proximity to, and spaced a substantially uniform distance from, the blocking element surface, said method comprising: providing a plurality of laterally spaced pockets arranged in a plurality of rows to form a field of pockets on but not extending through the first structure surface, or on but not extending through the blocking element surface, or on but not extending through both the first structure surface and the blocking element surface; providing a working fluid at the blocking element first end; and moving the blocking element surface relative to the first structure surface to produce a seal equivalent due to working fluid turbulence induced by the field of pockets.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

DETAILED DESCRIPTION OF EMBODIMENTS OF THE INVENTION

Figure 1:
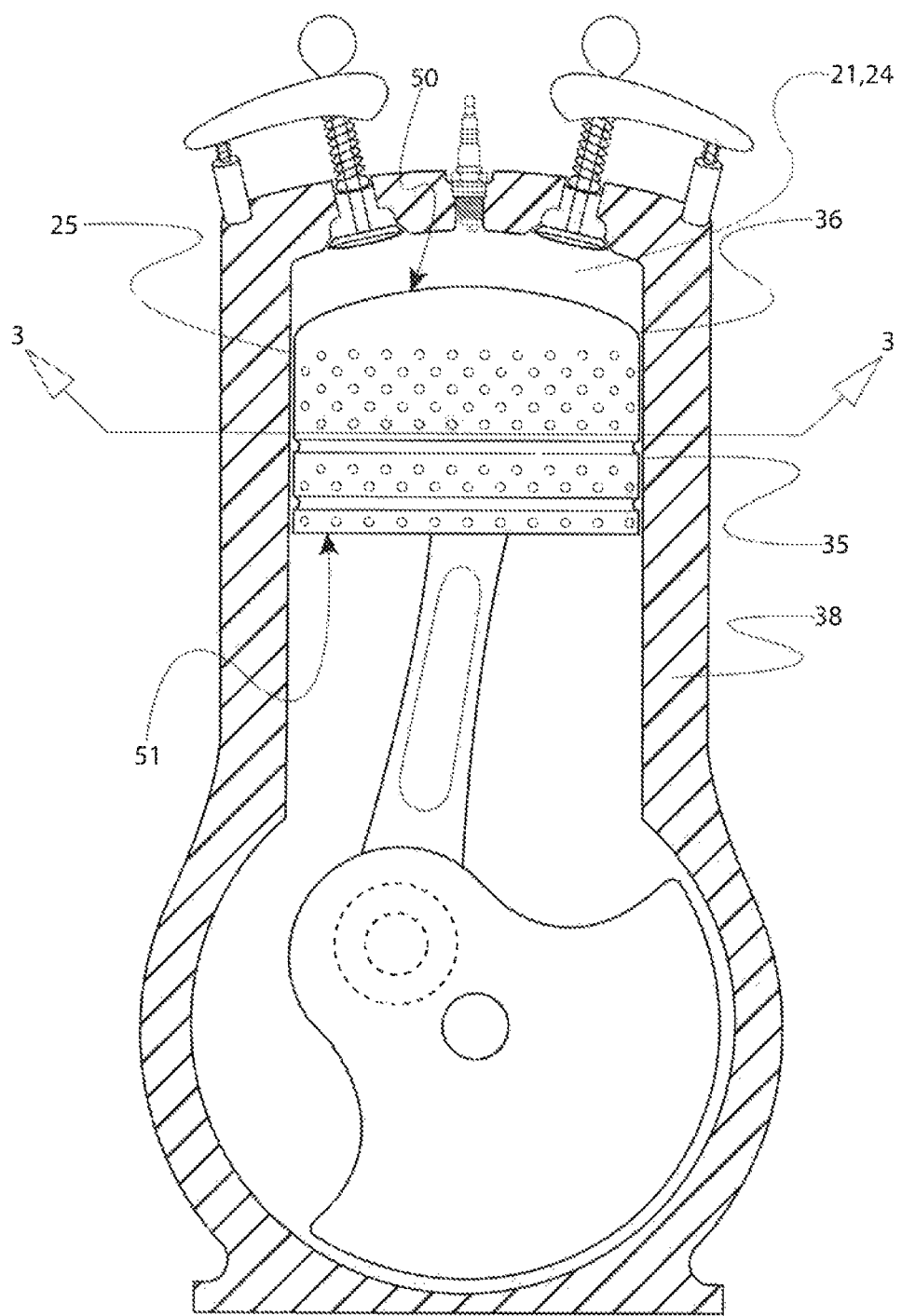
FIG. 1 is an end-on partial cross-sectional view of an internal combustion engine cylinder and a side view of a piston disposed therein, wherein the piston is attached to an unguided connecting rod and includes an outer sealing structure formed in accordance with a first embodiment of the present invention.

Reference will now be made in detail to embodiments of the present invention, examples of which are illustrated in the accompanying drawings. With reference to FIG. 1, in a first embodiment of the invention, a cooperatively shaped piston 36 and surrounding cylinder 38 are illustrated. The cylinder 38 may have a combustion chamber 21 having an upper end wall, which in this embodiment is slightly rounded or domed, as well as a continuous side wall. One or more spark or glow plugs, intake and exhaust valves, and associated ports, may communicate with the combustion chamber 21. An engine crankcase may be disposed below the engine cylinder 38.

The piston 36 may include an upper end 50 or head, a lower end 51 distal from the upper end, and a side wall or skirt 35 extending between the piston head and the lower end of the piston. The piston 36 may be attached to an unguided connector rod 42, which in turn may be connected to a crank 46, which is connected to a crankshaft 44 in the crankcase.

The piston skirt 35 may have a circular cross-section when viewed from above looking down into the cylinder 38 onto the piston head 50. The piston head 50 may be domed cooperatively with the upper end wall of the combustion chamber 21. When viewed from above, looking down into the cylinder 38, the cylinder may also have a circular shape. It is appreciated that the cylinder 38, piston skirt 35 and piston head 50 may have a non-circular cross-section shape, such as a rectangular shape, when viewed from above in alternative embodiments.

The piston 36 may be disposed within the combustion chamber 21 of the cylinder 38 such that the piston skirt 35 is closely aligned with, but uniformly spaced from and parallel to, the combustion chamber 21 side wall. The upper end wall and side wall of the combustion chamber 21, together with the piston head 50, may form a working space or compression area 24 which may receive a working fluid. The piston 36 may be configured to slide within the combustion chamber 21, reciprocally towards and away from the upper end wall.

Figure 3:
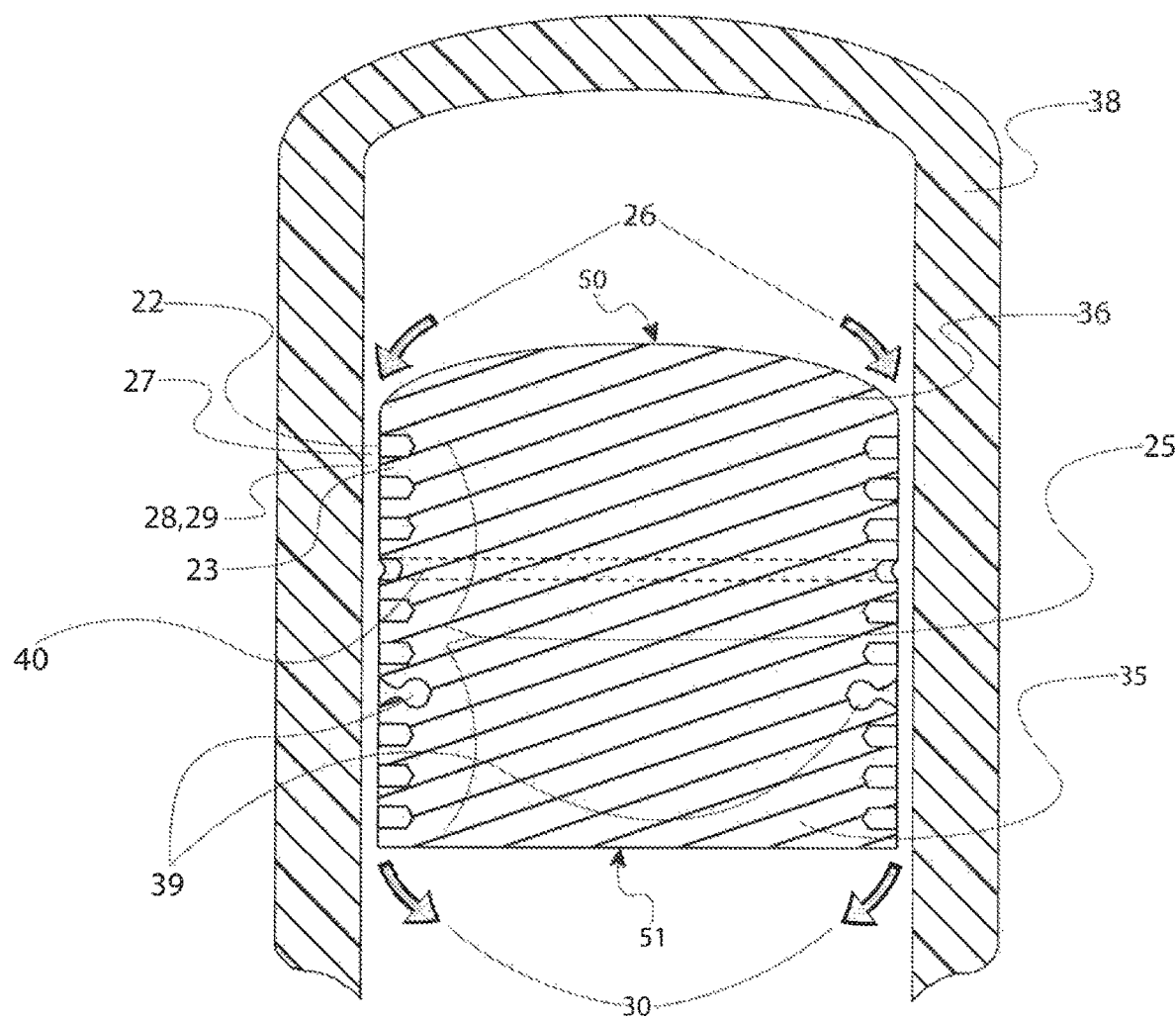
FIG. 3 is a cross-sectional view of the piston and cylinder of FIG. 1 taken through cut line 3-3, wherein the piston includes an outer sealing structure formed in accordance with the first embodiment of the present invention.

With reference to FIGS. 1 and 3, the outer surface or face of the piston skirt 35 may have a plurality of recesses or pockets 22 separated by lands 23 formed therein that collectively form a field 25 of pockets. Applicant regards pockets 22 formed "on" the piston skirt 35 to mean the same thing as being formed "in" the piston skirt. In both cases, the pockets 22 extend inward from the outer most surface of the piston skirt 35 surrounding the pockets. Preferably, but not necessarily, the pockets 22 may be of like shape and dimension in terms of shape at the mouth, shape at the base, height, width, diameter, depth, and/or volume. Preferably, the piston skirt 35 is a hollow wall structure (i.e., not solid between opposing outer points) and the pockets 22 are formed in the piston skirt but do not extend through the piston skirt to the hollow interior of the piston 36. The pockets 22 in the field 25 may be arranged in at least one circumferential row, or more preferably, in a grid or array pattern consisting of two or more spaced columns and rows of pockets. The number, shape, size and arrangement of the lands and pockets in the field 25 shown in the drawing figures was selected for ease of discussion and illustration and is not considered limiting.

The field 25 of pockets 22 may extend in two (x and y) dimensions on a planar surface or extend in two dimensions on the surface of an object curved in space (e.g., the piston 35 having a circular cross-section). Each of the pockets 22 may be aligned with pockets in adjacent rows and/or columns, aligned with the pockets disposed in rows and/or columns set one or more intervening rows and/or columns away, or unaligned with each other. Preferably, the field 25 of pockets 22 includes two or more pockets spaced from each other in the x direction and two or more pockets spaced from each other in the y-direction. Further, preferably the dimension or size of each of the pockets 22 at the mouth is significantly smaller than the dimension of the surface on which it is disposed (i.e., the field 25 dimensions) when measured in either the x or y direction. More, preferably, the dimension or size of each of the pockets 22 at the mouth is significantly smaller than the dimension of the surface on which it is disposed when measured in both the x and y direction. By significantly smaller, it is meant that the dimension or size of each pocket at the mouth is less than half, and more preferably, less than one quarter, of the dimension of the surface on which it is disposed when measured in the x and/or y direction. Further, the total surface area in the field 25 (e.g., the surface area of the piston skirt 35) occupied by the lands 23 preferably exceeds the total surface area attributable to the mouths of the pockets 22 in the field.

With reference to FIG. 3, a seal or seal equivalent may be produced over the expanse of the piston skirt 35, from top to bottom, due to the presence of the pockets 22 and lands 23 arranged in an appropriate sealing system field 25 on the face of the piston skirt. The seal or its equivalent may be generated as the result of the pressure difference of the working fluid between the piston head 50 and the piston lower end 51. As the piston 36 moves upward in the chamber 21, the pressure and temperature of the working fluid 26 in the working space 24 may rise and produce a working fluid pressure differential between the head 50 of the piston 36 and the piston lower end 51. This pressure differential may cause the working fluid to flow in the space between the piston skirt 35 side wall and the combustion chamber 21 side wall, i.e., to flow in the seal gap towards the lower end 51 of the piston 36. Flow of the working fluid 26 through the seal gap may induce a local Venturi effect at each pocket 22, which may increase the speed and decrease the pressure of the working fluid 26. The speed and pressure change of the working fluid 26 may be a function of the practical small clearance distance between the piston skirt 35 side wall and the combustion chamber 21 side wall, as well as a function of the geometry and arrangement of the pockets 22.

With continued reference to FIG. 3, the pockets 22 preferably may have relatively sharp edges at the junction of the pocket mouth with the face of the piston skirt 35, i.e., at the junction with the lands 23. As the working fluid 26 flows over the sharp edge of a pocket 22, a decrease in local pressure may occur due to turbulence. As a result, the working fluid 26 may expand creating a momentary decrease in pressure and an increase of localized turbulence. Further working fluid 26 flowing over and into each successive pocket 22 may begin a cycle wherein each pocket 22 serves as a resonator (e.g., Helmholtz-like resonator), which may cause the working fluid to be drawn into and expelled out of the pocket 22 at a definable frequency creating further localized turbulence.

The resulting turbulence may be a function of the physical properties of the working fluid 26 in the system and the diameter (or height and width), internal geometry, relational location, and depth of each individual pocket 22 in the field 25. The resulting turbulence may also be a function of the practical small clearance distance or seal gap due to the ratio of the spatial volume above each land 23 to the spatial volume above and within each pocket 22. This localized turbulence may interact with the flowing working fluid 26 and generate a vortex motion that impedes further flow of the working fluid 26. The decrease in working fluid flow may momentarily decrease the resonance effect, which in turn may momentarily decease the localized turbulence, which then may allow the flow rate of the working fluid 26 to momentarily increase again.

When the piston 36 is on an upward stroke, the working fluid 26 which has passed over the pockets 22 in the upper most row (closest to the piston 36 upper end) may next encounter the pockets in the adjacent row of the pocket field 25 where the described turbulence phenomena repeats, but at a lower starting pressure. This process may repeat as the working fluid 26 passes over successive rows of the sealing system pocket field 25 with successively relatively decreased starting pressure until the local pressure in the seal gap is sufficiently reduced (preferably, but not necessarily, to the pressure level of the working fluid contained in the cylinder 38 below the piston 36). The repeating cycle of pressure reduction from pocket 22 to pocket in the field 25 may create a seal or the effective equivalent of a seal since only a tolerably (or preferably no) working fluid 26 will flow past the point at which the local pressure in the seal gap is at or below the pressure of the working fluid in the space below the piston 36. It is appreciated that a "seal equivalent" with a tolerable level of leakage resulting from sufficiently reduced pressure across the face of the piston skirt 35, results when the amount of leakage of working fluid permits the operation of the engine in which the seal equivalent is utilized.

The localized turbulence at each successive pocket 22 may decrease with time due to the gradual leaking allowed by the resonant action of the pockets. Therefore, the localized turbulence may also be a function of the rate of motion of the piston 36 relative to the chamber 21 side wall, as the motion may be responsible for the pressure changes around the piston 36 in the chamber. The effectiveness of the sealing system may require working fluid 26 pressures which fluctuate to provide energetic flows into the sealing system field 25 by providing a consistent flow in and out of the pockets 22, thereby maintaining the effectiveness of the sealing system.

The rate of the sealing system leakage may be modified by using different land 23 spacing patterns and pocket 22 geometries within the sealing system pattern 25. The land 23 spacing may be selected to induce the pockets 22 to provide counter flow to prior (upper) pockets while forward (lower) pockets may prevent working fluid 26 flow to induce internal decaying self-reinforcing oscillations within the sealing system field 25.

The effectiveness of the sealing system pattern 25 for a particular application may be a function of the outside dimensions of the sealing system field 25 in addition to the design parameters of the individual pockets 22. With renewed reference to FIG. 3, the seal efficiency may be improved by modifying the geometry of some or all of the pockets 22 to include a convergent area 39 at the inner base of the pockets and a divergent area at the mouth of the pockets. A de Laval nozzle effect may be produced at the pockets using a convergent area 39 and a larger divergent area to form a resonant cavity at the bottom of the pockets, which may create greater localized turbulence due to localized supersonic working fluid 26 movement.

With reference to FIGS. 1 and 3, the piston 36 may self-center within the cylinder 38 due to the tendency of the pressure surrounding the piston to normalize at any given vertical point on the piston skirt 35. For example, when the practical small clearance distance, i.e., the seal gap, between the piston 36 and the cylinder 38 are momentarily unequal about a central axis, a total normalizing force may be generated by the pressures acting on the surface area of the opposing sides of the piston. This total normalizing force may urge the piston 36 to be centrally located within the cylinder 38 with a dampened oscillation about the central axis. The time required for the normalizing force to return the piston to the center of the cylinder may be decreased by adding one or more equalizing grooves 40. The equalizing grooves 40 may be disposed on land 23 areas, or between pockets 22, or both on land areas and between pockets, or in the side wall of the chamber 21 opposing the pockets to allow a more uniform distribution of the forces more rapidly on the surface employing the sealing system.

Figure 2:
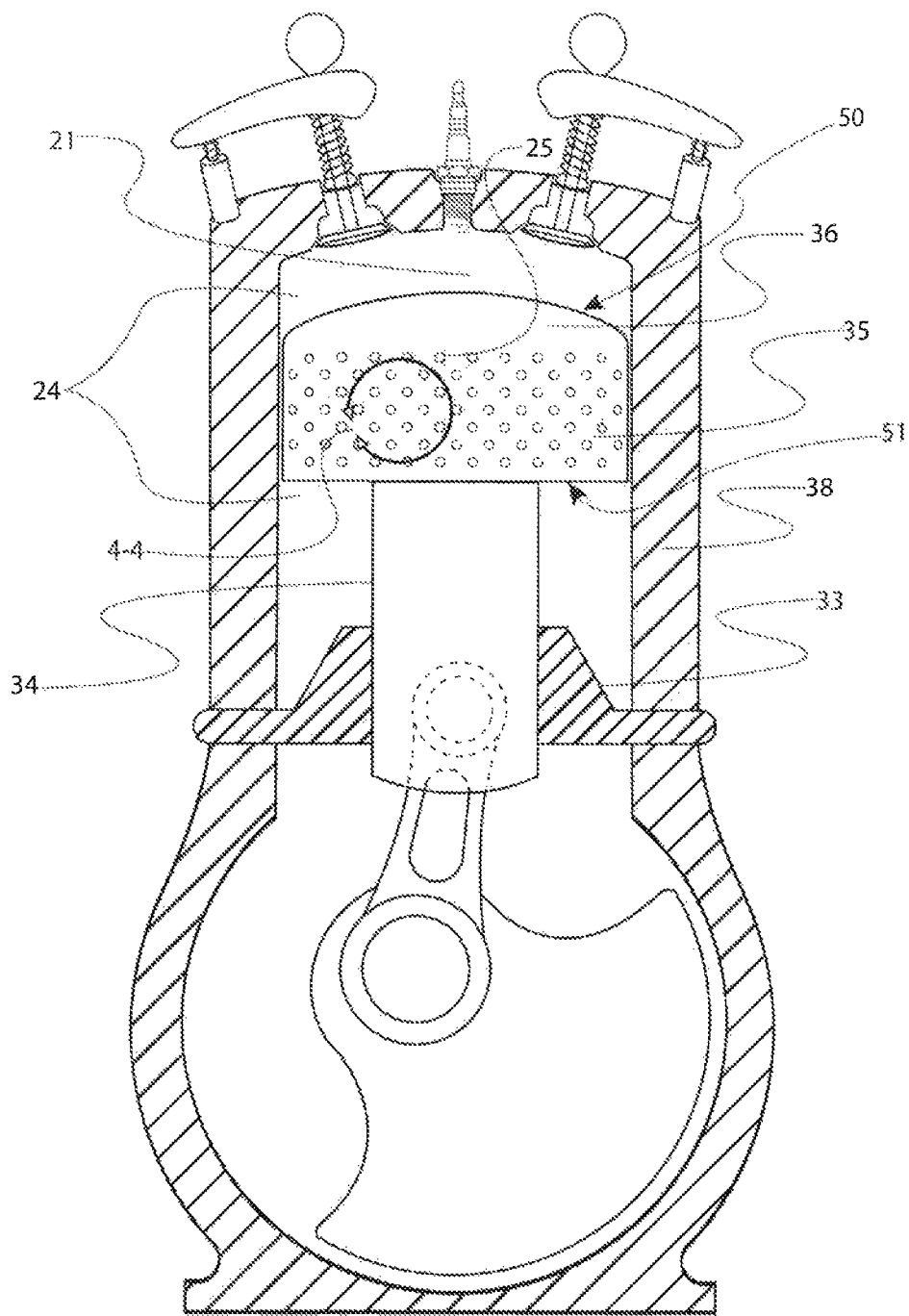
FIG. 2 is an end-on partial cross-sectional view of an internal combustion engine cylinder and a side view of a piston disposed therein, wherein the piston is attached to a guided connecting rod and includes an outer sealing structure formed in accordance with a second embodiment of the present invention.
Figure 4:
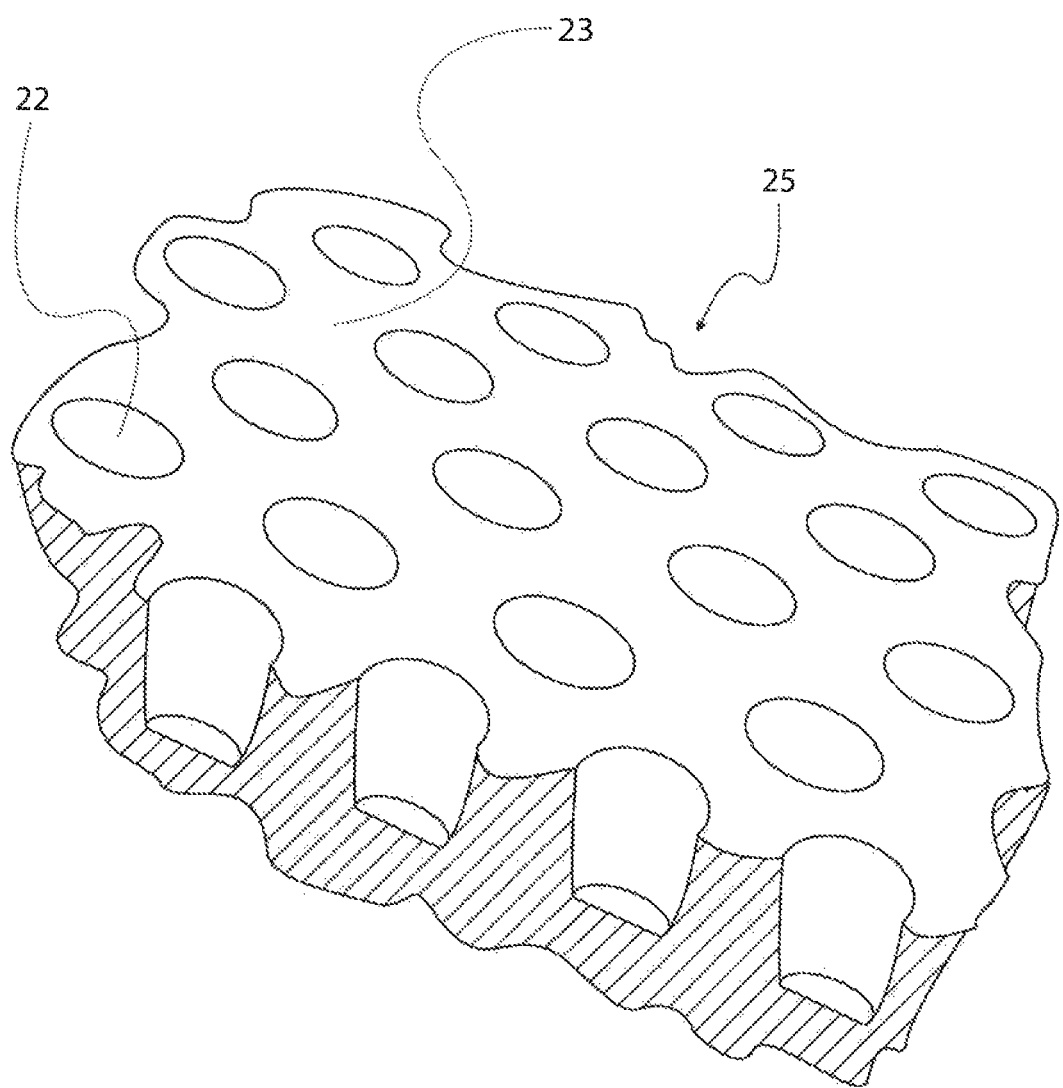
FIG. 4 is an isometric enlarged view of a portion of the piston wall defined by cut line 4-4 in FIG. 2, wherein the piston wall portion includes the outer sealing structure formed in accordance with the first and second embodiments of the present invention.

An alternative embodiment of the present invention is illustrated in FIGS. 2 and 4. With reference to FIG. 2, the piston 36 is disposed in the cylinder 38 and includes a piston skirt 35 with a field 25 of pockets 22 and a piston head 46. The field 25 of pockets 22 is provided without any equalizing grooves. The piston 36 is connected to a crankshaft 44 by a crank 46, a connector rod 42, and a cross-head 34. The cross-head 34 is slidably received in a cross-head guide 33 which permits the cross-head 34 and the piston 36 to move in a vertical direction while maintaining the piston 36 in a centered position relative to the combustion chamber 21. Section 4-4 of the pocket field 25 is shown in detail in FIG. 4, in which the pockets 22 and lands 23 have a junction edge which is relatively sharp at the pocket mouth.

Figure 5:
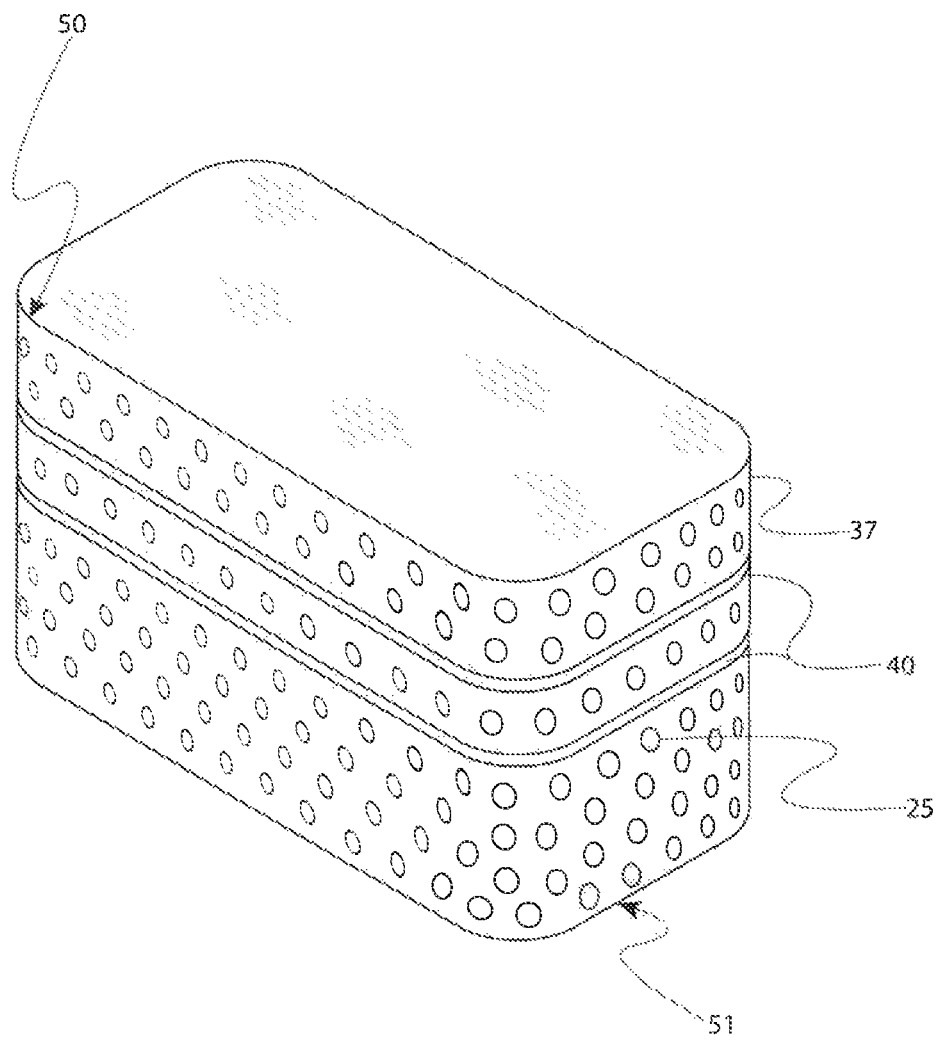
FIG. 5 is an isometric view of a rectangular shaped variant of a piston formed in accordance with a third embodiment of the present invention.
Figure 6:
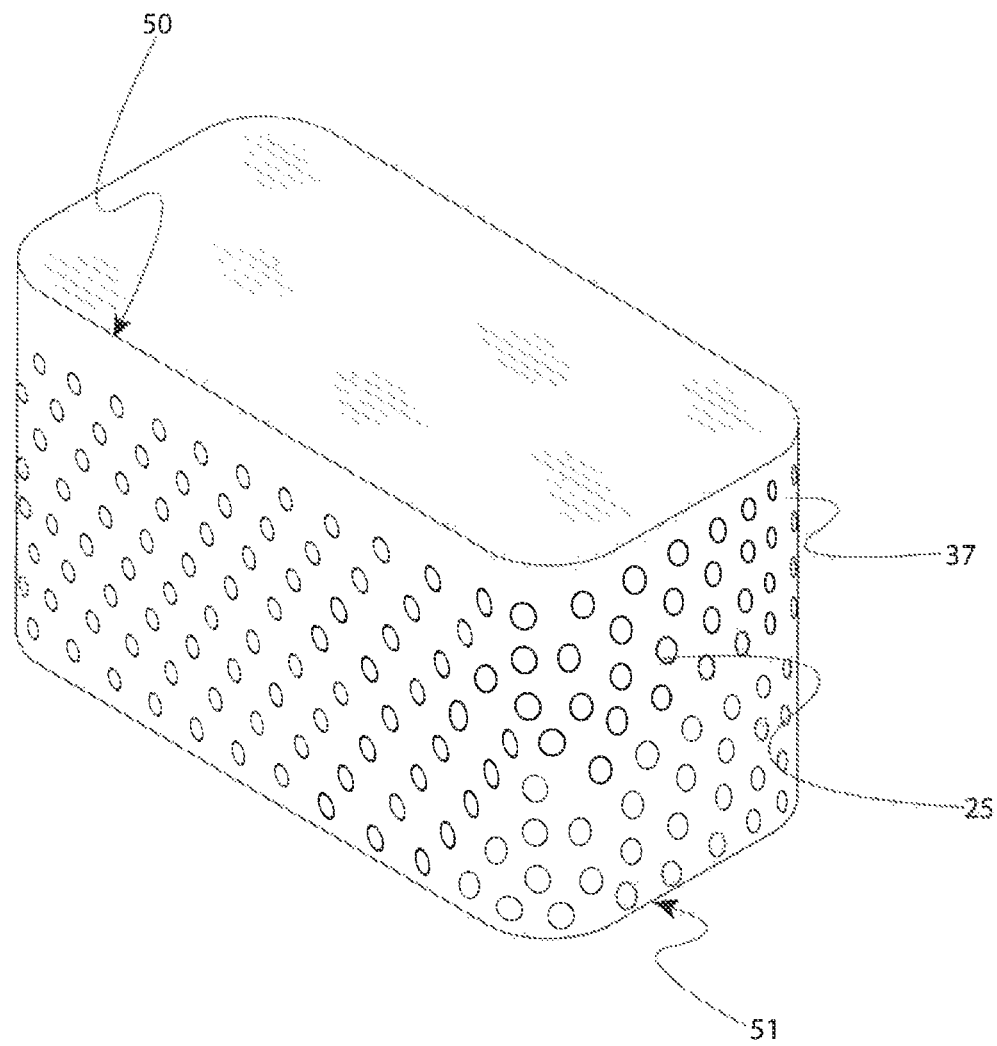
FIG. 6 is an isometric view of a rectangular shaped variant of a piston formed in accordance with a fourth embodiment of the present invention.

The piston skirt 35 may not have an outer perimeter circular shape in alternative embodiments of the invention, but instead may be formed in any shape, such as ovular, rectangular, etc., so long as any corners of the shape are rounded. For example, third and fourth embodiments of the present invention are illustrated in FIGS. 5 and 6 in which the pistons do not have a circular cross-section. FIG. 5 illustrates a rectangular piston 37 analogue of the circular piston embodiment of FIG. 1 which includes a field 25 of pockets and equalizing grooves 40 disposed on the piston skirt between the piston head 50 and the piston lower end 51. The equalizing grooves 40 may extend around the circumference of the piston skirt 35 to form a continuous closed loop structure that allows the pressure of the working fluid surrounding the piston skirt to balance or equalize itself to be the same at all points. FIG. 6 illustrates a rectangular piston 37 analogue of the circular piston embodiment of FIG. 2 which includes a field 25 of pockets disposed on the piston skirt between the piston head 50 and the piston lower end 51, but no equalizing grooves.

Figure 7:
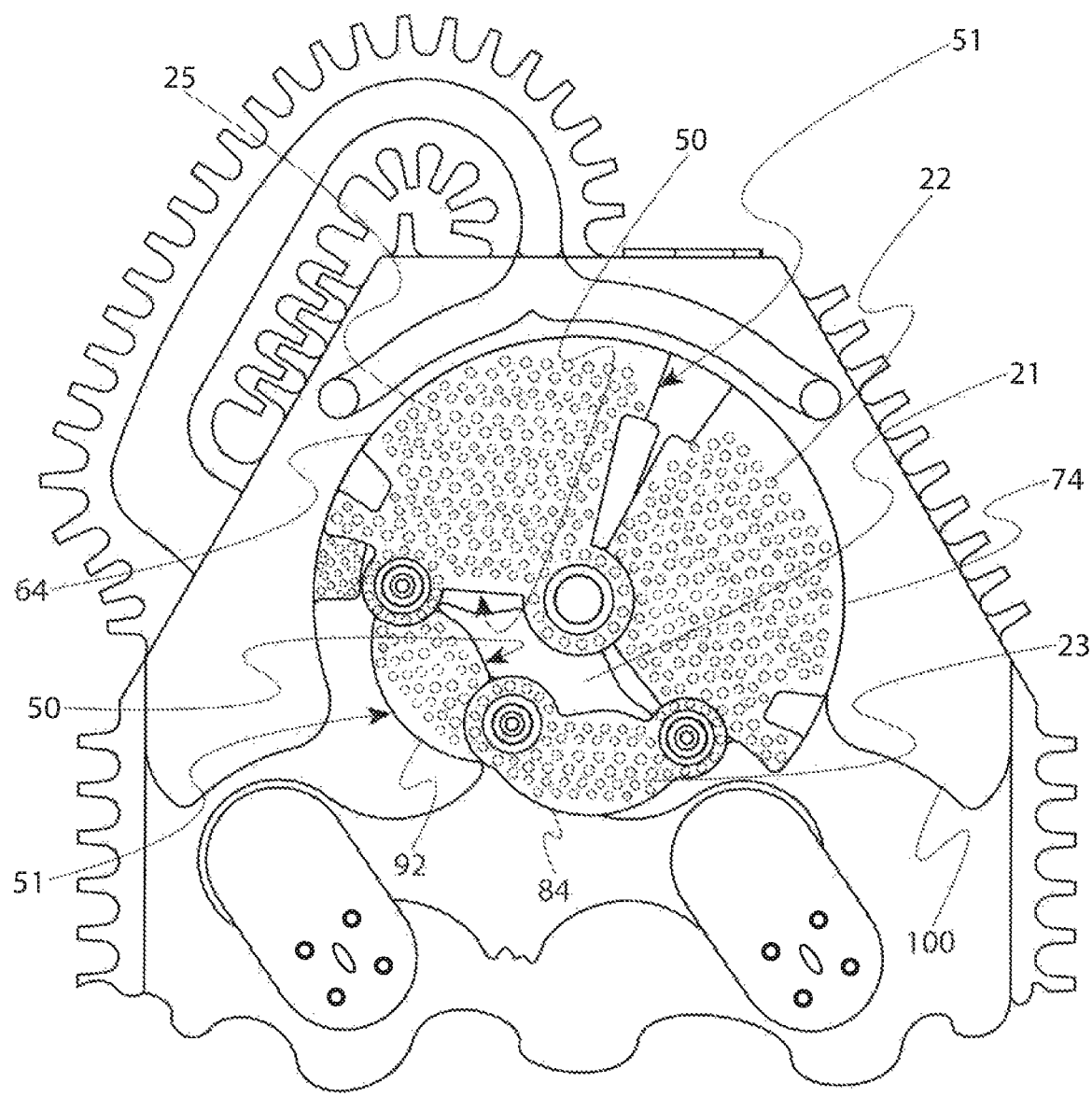
FIG. 7 is a top plan view of a rotary engine cylinder and rotor including an outer sealing structure formed in accordance with a fifth embodiment of the present invention.

A fifth embodiment of the present invention is illustrated in FIG. 7 which shows a partial cross-sectional view of a rotary engine housing and the internal rotary engine components. The rotary engine housing may house a first rotatable vane 64, a second rotatable vane 74, a third rotatable vane 84, and a fourth rotatable vane 92 which are interconnected (e.g., hinged) together, as well as a horseshoe supercharger boss 100. Each of the vanes 64, 74, 84, 92, and the boss 100, may have a field 25 of pockets 22 separated by lands 23 formed on an outer surface that rotates about a center axis relative to a flat side wall (removed) of the rotary engine housing. The vanes 64, 74, 84, 92, and the boss 100, may be spaced from, and parallel to, the flat side wall of the rotary engine housing so that a seal equivalent is provided between interior sides of each of the vanes which collectively define the combustion chamber 21, and the exterior sides of each of the vanes which are distal from the interior sides when the vanes and boss rotate.

It is appreciated that the described pistons, vanes, and other structures (collectively referred to as "blocking elements") which are configured to form a seal equivalent with a surface, such as a chamber wall, may be used not only in power producing engines, but pumps and other devices within which a seal or seal equivalent is needed.

It is also appreciated that the field 25 of pockets 22, and/or the equalizing grooves 40, described as being formed on or in the surface of a blocking element may instead be formed on or in the surface opposing the blocking element in alternative embodiments. It is also appreciated that the field 25 of pockets 22 described as being formed on or in the surface of a blocking element may also be formed on or in the surface opposing the blocking element in addition to being formed on or in the surface of the blocking element.

It is also appreciated that the foregoing described structures may be used to provide a sealing system for fluids, including without limitation, compressible fluids, gasses, liquids, suspensions, plasmas, and Bose-Einstein condensates.

It is also appreciated that pockets 22 may have any shape at the mouth, at a bottom, and along the pocket internal walls extending between the mouth and the bottom, that is effective for producing the desired pressure reduction effect. Such shapes may be rounded, circular, rectangular, square, trapezoidal, parallelogram, rhombic, oval, elliptical, triangular, and polygonal, for example. The cross-sections of the equalizing grooves 40 may also have any of the foregoing or other shapes so long as they produce the desired pressure balancing effect. It is also appreciated that the pockets 22 may have flat, rounded, or contoured bottoms distal from the pocket mouths. A flat pocket 22 bottom may extend in a plane that is parallel to the plane in which the lands 23 surrounding the pocket extend. Alternatively, such flat pocket bottoms may be angled and extend in planes that are non-parallel to the plane in which the surrounding lands extend.

It is also appreciated that the pockets 22 may in some embodiments have filleted, chamfered, or other broken/non-sharp edges at the junction of the pocket mouth with the surrounding lands.

As will be understood by those skilled in the art, the invention may be embodied in other specific forms without departing from the spirit or essential characteristics thereof. The elements described above are provided as illustrative examples of one technique for implementing the invention. One skilled in the art will recognize that many other implementations are possible without departing from the present invention as recited in the claims. For example, the pockets and/or pattern of pockets need not be uniform and/or the lands need not be flat without departing from the intended scope of the invention. Further, the pattern of pockets may be provided in the cylinder wall instead of, and/or in addition to on the piston skirt. Accordingly, the disclosure of the present invention is intended to be illustrative, but not limiting, of the scope of the invention. It is intended that the present invention cover all such modifications and variations of the invention, provided they come within the scope of the appended claims and their equivalents.

What is claimed is:

1. A sealing system comprising:
a first structure surface;
a blocking element having a first end, a second end, and a blocking element surface extending between the first end and the second end;
a plurality of laterally spaced pockets arranged in a plurality of rows to form a field of pockets on but not extending through the first structure surface, or on but not extending through the blocking element surface, or on but not extending through both the first structure surface and the blocking element surface;
a gaseous working fluid provided at the blocking element first end at an elevated pressure relative to a gaseous working fluid pressure at the blocking element second end; and
an equalizing groove formed in the field of pockets on but not extending through the first structure surface, or on but not extending through the blocking element surface,
wherein one or both of the first structure and the blocking element have a perimeter,
wherein the equalizing groove is a continuous closed loop structure extending around the perimeter of the first structure or the blocking element such that a plurality of said pockets are provided on opposite sides of a reference plane that is coplanar with the equalizing groove,
wherein said equalizing groove remains unoccupied to receive said gaseous working fluid,
wherein the first structure surface is disposed in close proximity to, and spaced a substantially uniform distance from, the blocking element surface, and
wherein a seal equivalent is produced from gaseous working fluid interaction with the field of pockets.

2. The sealing system of claim 1, wherein the plurality of laterally spaced pockets have a like size and shape.

3. The sealing system of claim 1, wherein the plurality of laterally spaced pockets have a different size and shape.

4. The sealing system of claim 1, wherein the plurality of laterally spaced pockets are arranged in a pattern having a plurality of rows of pockets and a plurality of columns of pockets.

5. The sealing system of claim 1, wherein the plurality of laterally spaced pockets each have a pocket mouth with a sharp edge formed at a junction of the pocket with the first structure surface or the blocking element surface.

6. The sealing system of claim 1, wherein the first structure surface is provided by a cylinder wall, and the blocking element surface is provided by a skirt of a piston.

7. The sealing system of claim 6, wherein the cylinder wall is provided in the cylinder of an internal combustion engine, and the piston is an internal combustion engine piston.

8. The sealing system of claim 1, wherein the plurality of laterally spaced pockets each have a circular pocket mouth formed at a junction of the pocket with the first structure surface or the blocking element surface.

9. The sealing system of claim 1, wherein the plurality of laterally spaced pockets each have a rectangular pocket mouth formed at a junction of the pocket with the first structure surface or the blocking element surface.

10. The sealing system of claim 1, wherein one or more of the plurality of laterally spaced pockets have a convergent portion and a divergent portion.

11. A sealing system comprising:
a first structure surface;
a blocking element having a first end, a second end, and a blocking element surface extending between the first end and the second end;
a plurality of spaced pockets arranged as a field of pockets on but not extending through the first structure surface, or on but not extending through the blocking element surface, or on but not extending through both the first structure surface and the blocking element surface; and
an equalizing groove formed in the field of pockets on but not extending through the first structure surface, or on but not extending through the blocking element surface,
wherein one or both of the first structure and the blocking element have a perimeter,
wherein the equalizing groove is a continuous closed loop structure extending around a perimeter of the first structure or the blocking element such that a plurality of said pockets are provided on opposite sides of a reference plane that is coplanar with the equalizing groove, and wherein said equalizing groove remains unoccupied to receive a gaseous working fluid, wherein the first structure surface is disposed in close proximity to, and spaced a substantially uniform distance from, the blocking element surface.

12. The sealing system of claim 11, wherein the plurality of spaced pockets have a like size and shape.

13. The sealing system of claim 11, wherein the plurality of spaced pockets have a different size and shape.

14. The sealing system of claim 11, wherein the plurality of spaced pockets are arranged in a pattern having a plurality of rows of pockets and a plurality of columns of pockets.

15. The sealing system of claim 11, wherein the plurality of spaced pockets each have a pocket mouth with a sharp edge formed at a junction of the pocket with the first structure surface or the blocking element surface.

16. The sealing system of claim 11, wherein the first structure surface is provided by a cylinder wall, and the blocking element surface is provided by a skirt of a piston.

17. The sealing system of claim 16, wherein the cylinder wall is provided in the cylinder of an internal combustion engine, and the piston is an internal combustion engine piston.

18. The sealing system of claim 11, wherein the plurality of spaced pockets each have a circular pocket mouth formed at a junction of the pocket with the first structure surface or the blocking element surface.

19. The sealing system of claim 11, wherein the plurality of spaced pockets each have a rectangular pocket mouth formed at a junction of the pocket with the first structure surface or the blocking element surface.

20. The sealing system of claim 11, wherein one or more of the plurality of spaced pockets have a convergent portion and a divergent portion.

21. An internal combustion engine comprising:
an engine cylinder having a cylinder wall;
a piston disposed in the engine cylinder, said piston having a skirt and a head;
a plurality of spaced pockets arranged as a field of pockets on but not extending through the piston skirt, or on but not extending through the cylinder wall, or on but not extending through both the piston skirt and the cylinder wall; and
an equalizing groove formed in the field of pockets on but not extending through the cylinder wall, or on but not extending through the piston skirt,
wherein the equalizing groove is a continuous closed loop structure extending around a perimeter of the cylinder wall or the piston skirt such that a plurality of said pockets are provided on opposite sides of a reference plane that is coplanar with the equalizing groove, and
wherein said equalizing groove remains unoccupied to receive a gaseous working fluid.

22. The internal combustion engine of claim 21, wherein the plurality of spaced pockets have a like size and shape.

23. The internal combustion engine of claim 21, wherein the plurality of spaced pockets have a different size and shape.

24. The internal combustion engine of claim 21, wherein the plurality of spaced pockets are arranged in a pattern having a plurality of rows of pockets and a plurality of columns of pockets.

25. The internal combustion engine of claim 21, wherein the plurality of spaced pockets each have a pocket mouth with a sharp edge formed at a junction of the pocket with the cylinder wall or the piston skirt.

26. The internal combustion engine of claim 21, wherein the plurality of spaced pockets each have a circular pocket mouth formed at a junction of the pocket with the cylinder wall or the piston skirt.

27. The internal combustion engine of claim 21, wherein the plurality of spaced pockets each have a rectangular pocket mouth formed at a junction of the pocket with the cylinder wall or the piston skirt.

28. A method of sealing a first structure surface relative to a blocking element surface between a blocking element first end and a blocking element second end, wherein the first structure surface is disposed in close proximity to, and spaced a substantially uniform distance from, the blocking element surface, said method comprising:
providing a plurality of laterally spaced pockets arranged in a plurality of rows to form a field of pockets on but not extending through the first structure surface, or on but not extending through the blocking element surface, or on but not extending through both the first structure surface and the blocking element surface;
providing an equalizing groove formed in the field of pockets on but not extending through the first structure surface, or on but not extending through the blocking element surface,
wherein the equalizing groove is a continuous closed loop structure extending around a perimeter of the first structure or the blocking element such that a plurality of said pockets are provided on opposite sides of a reference plane that is coplanar with the equalizing groove,
providing a gaseous working fluid at the blocking element first end; and
wherein said equalizing groove remains unoccupied to receive said gaseous working fluid;
moving the blocking element surface relative to the first structure surface to produce a seal equivalent due to gaseous working fluid turbulence induced by the field of pockets.

* * * * *